US010544348B2

(12) United States Patent
Santos et al.

(10) Patent No.: US 10,544,348 B2
(45) Date of Patent: Jan. 28, 2020

(54) BIOPOLYMER COMPOSITE FOR WATER-BASED TREATMENT FLUIDS

(71) Applicant: Halliburton Energy Services, Inc., Houston, TX (US)

(72) Inventors: Catherine M. Santos, Houston, TX (US); Shubhajit Ghosh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 15/536,540

(22) PCT Filed: Mar. 5, 2015

(86) PCT No.: PCT/US2015/019075
§ 371 (c)(1),
(2) Date: Jun. 15, 2017

(87) PCT Pub. No.: WO2016/140689
PCT Pub. Date: Sep. 9, 2016

(65) Prior Publication Data
US 2017/0362486 A1    Dec. 21, 2017

(51) Int. Cl.
*C09K 8/12*    (2006.01)
*C09K 8/08*    (2006.01)
(Continued)

(52) U.S. Cl.
CPC .............. *C09K 8/12* (2013.01); *C09K 8/08* (2013.01); *C09K 8/882* (2013.01); *C09K 8/885* (2013.01);
(Continued)

(58) Field of Classification Search
CPC ... C09K 8/08; C09K 8/12; C09K 8/68; C09K 8/882; C09K 8/885; C09K 8/90;
(Continued)

(56) References Cited

U.S. PATENT DOCUMENTS 6,281,172 B1    8/2001  Warren et al.
6,764,981 B1    7/2004  Eoff et al.
(Continued)

FOREIGN PATENT DOCUMENTS

CA        2428096 A1     6/2002
WO    2003025086 A1     3/2003
(Continued)

OTHER PUBLICATIONS

International Search Report and Written Opinion dated Sep. 21, 2015 in International Patent Application No. PCT/201510/9075.
(Continued)

*Primary Examiner* — Alicia Bland
(74) *Attorney, Agent, or Firm* — McGuireWoods LLP

(57) ABSTRACT

An aqueous-based treatment fluid comprising: a base fluid, wherein the base fluid comprises water; and an additive, wherein the additive comprises a biopolymer matrix and a compound comprising a functional group containing nitrogen, A method of using the aqueous-based treatment fluid comprising: introducing the treatment fluid into a wellbore, wherein the wellbore penetrates a subterranean formation.

10 Claims, 2 Drawing Sheets

(51) Int. Cl.
*C09K 8/88* (2006.01)
*C09K 8/90* (2006.01)
*E21B 21/00* (2006.01)
*E21B 21/06* (2006.01)
*E21B 33/14* (2006.01)

(52) U.S. Cl.
CPC .............. *C09K 8/905* (2013.01); *E21B 21/00* (2013.01); *E21B 21/003* (2013.01); *E21B 21/062* (2013.01); *E21B 33/14* (2013.01)

(58) Field of Classification Search
CPC ....... C09K 8/905; E21B 21/00; E21B 21/003; E21B 21/062; E21B 33/14
See application file for complete search history.

(56) References Cited

U.S. PATENT DOCUMENTS

| | | | |
|---|---|---|---|
| 2003/0230431 A1* | 12/2003 | Reddy ................ | C09K 8/12 175/64 |
| 2004/0220058 A1 | 11/2004 | Eoff et al. | |
| 2005/0261139 A1* | 11/2005 | Reddy ................ | C09K 8/12 507/209 |
| 2009/0239771 A1 | 9/2009 | Federici et al. | |
| 2012/0132422 A1 | 5/2012 | Mirakyan et al. | |
| 2015/0344767 A1* | 12/2015 | Lei ..................... | C08B 11/20 507/224 |

FOREIGN PATENT DOCUMENTS

| | | |
|---|---|---|
| WO | WO2006013595 A1 | 2/2006 |
| WO | 2010031993 A1 | 3/2010 |
| WO | 2014059167 A1 | 4/2014 |
| WO | WO-2014088850 A2 * | 6/2014 ............ C08B 11/20 |

OTHER PUBLICATIONS

Tamsilian, Y; Study of Hydrogel Modified Drilling Fluid: Preparation, Rheological Properties and Swelling Behaviors of Chitosan N-Isopropylacrylamide Hydrogel; S. A. A. Brazilian Journal of Petroleum and Gas, 2012, 6, 79.

Canadian Office Action dated May 28, 2018; Canadian Application No. 2,971,863.

Patel, Arvind, et al. "Advances in inhibitive water-based drilling fluids—can they replace oil-based muds?." International Symposium on Oilfield Chemistry. Society of Petroleum Engineers, 2007.

Patel, Arvind D. "Design and development of quaternary amine compounds: shale inhibition with improved environmental profile." SPE International Symposium on Oilfield Chemistry. Society of Petroleum Engineers, 2009.

Peng, Bo, et al. "Structure—property relationship of polyetheramines as clay-swelling inhibitors in water-based drilling fluids." Journal of Applied Polymer Science 129.3 (2013): 1074-1079.

Orts, William J., et al. "Preventing soil erosion with polymer additives." Polymer News 24 (1999): 406-413.

Clark, R. K., et al. "Polyacrylamide/potassium-chloride mud for drilling water-sensitive shales." Journal of Petroleum technology 28.06 (1976): 719-727.

Australian Examination Report dated Nov. 24, 2017; Australian Application No. 2015384773.

Jain, Rajat, Vikas Mahto, and Triveni K. Mahto. "Study of the effect of xanthan gum based graft copolymer on water based drilling fluid." Journal of Macromolecular Science, Part A 51.12 (2014): 976-982.

* cited by examiner

BIOPOLYMER COMPOSITE FOR WATER-BASED TREATMENT FLUIDS

TECHNICAL FIELD

Additives, such as shale stabilizers, fluid loss additives, and biocides, can be used in aqueous-based treatment fluids. The additives can help prevent adverse effects of the water from the treatment fluid on a water-sensitive subterranean formation.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
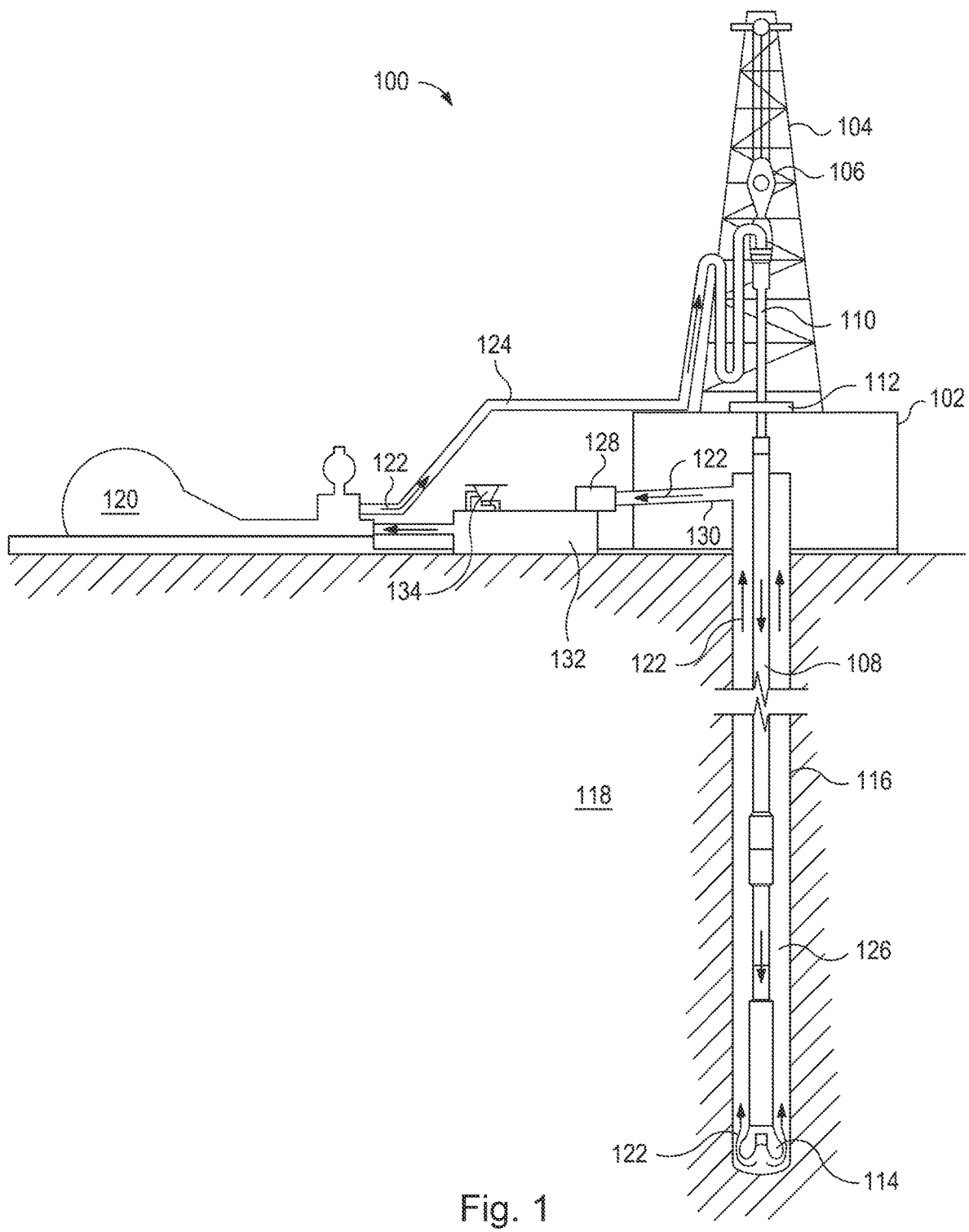
FIG. 1 illustrates a system for preparation and delivery of a treatment fluid to a wellbore according to certain embodiments.

Oil and gas hydrocarbons are naturally occurring in some subterranean formations. In the oil and gas industry, a subterranean formation containing oil or gas is referred to as a reservoir. A reservoir may be located under land or offshore. Reservoirs are typically located in the range of a few hundred feet (shallow reservoirs) to tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase, whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. The "base fluid" is the solvent of a solution or the continuous phase of a heterogeneous fluid. As used herein, the phrase "aqueous-based" means a solution wherein an aqueous liquid is the solvent or a heterogeneous fluid wherein an aqueous liquid makes up the continuous phase.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation, including into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A treatment fluid can be used to treat a portion of a wellbore. Examples of common treatment fluids include, but are not limited to, drilling fluids, spacer fluids, cement compositions, completion fluids, stimulation fluids (e.g., fracturing fluids), and workover fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

Due to the low cost of obtaining water, most treatment fluids are aqueous based. However, some subterranean formations can be adversely affected by water. One example of a formation that can be adversely affected by an aqueous-based fluid is a water-sensitive formation. When the water of the fluid comes in contact with a water-sensitive formation, then the water can adversely affect the subterranean formation. Some of the adverse effects can include swelling or sloughing of the subterranean formation or gumbo formation. The amount of reactivity of the subterranean formation to water will generally depend on the components making up the formation. As such, some water-sensitive subterranean formations are more reactive than other kinds of water-sensitive formations. For example, if the formation contains, smectite clay, then the smectite is generally highly reactive to water and will swell more easily than other types of clays.

An example of a water-sensitive formation is a shale formation. Shale formations are different from other types of formations and there are even differences between individual shale formations. Typically, no two shale formations are the same. Therefore, finding ways to explore and develop shale gas from these formations is a challenge. However, exploration and production of shale gas as an alternative to natural gas produced from "traditional formations" continues to receive increased interest due to the vast quantity of unproduced shale gas around the world and especially in North America.

Additives can be used in treatment fluids. Additives can be used as a rheology modifier, shale stabilizer, fluid-loss control additive, and biocide, among other things. A rheology modifier can be used to modify the rheology of a fluid to make the fluid conform to desired properties and results, such as viscosity and pumpability. A shale stabilizer can minimize or eliminate some of the adverse effect that water can have on the water-sensitive formation. A fluid-loss control additive can be used to reduce or eliminate the amount of base fluid that might otherwise leak off into the formation. A "biocide" is a chemical substance or microorganism that can destroy, deter, render harmless, or exert a controlling effect on another organism by chemical or biological means. Biocides can be added to other materials (typically liquids) in order to protect the material against biological infestation and growth. Some chemical biocides are synthetic. Biocides that are microorganisms include several types of bacteria. Biocides are also used as antifouling agents and disinfectants.

There is a continuing need and, thus, ongoing industry-wide interest in new additives for treatment fluids. It has been discovered that a polymer composite can be used as an additive in aqueous-based treatment fluids.

A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer.

As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally by using a cross-linking agent that reacts with the polymer molecules to link the polymer molecules. A second polymer can also be grafted onto the backbone of a first polymer.

Some of the desirable properties of a treatment fluid include: good rheology; low fluid loss into the subterranean formation; and a high shale retention value.

If any laboratory test (e.g., rheology or fluid loss) requires the step of mixing, then the treatment fluid is mixed according to the following procedures. A known volume (in units of barrels) of the aqueous liquid is added to a mixing container and the container is then placed on a mixer base. The motor of the base is then turned on and maintained at 11,200 to 11,800 revolutions per minute (rpm). The additives are added to the base liquid at a stated concentration. It is to be understood that any mixing is performed at ambient temperature and pressure—about 71° F. (22° C.) and about 1 atm (0.1 MPa).

It is also to be understood that if any laboratory test (e.g., rheology or fluid loss) requires the test be performed at a specified temperature and possibly a specified pressure, then the temperature and pressure of the treatment fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.72° C./min) to simulate actual wellbore conditions. After the treatment fluid is ramped up to the specified temperature and possibly pressure, the treatment fluid is maintained at that temperature and pressure for the duration of the testing.

A drilling fluid should exhibit good rheology. Rheology is a measure of how a material deforms and flows. As used herein, the "rheology" of a treatment fluid is measured according to ANSI/API 13B-1 section 6.3, Recommended Practice for Field Testing of Water-based Drilling Fluids as follows. The treatment fluid is mixed. The treatment fluid is placed into the test cell of a rotational viscometer, such as a FANN® Model 35 viscometer fitted with a Bob and Sleeve attachment and a F1 spring number. The treatment fluid is tested at the specified temperature and ambient pressure, about 1 atm (0.1 MPa). Rheology readings are taken at multiple revolutions per minute (rpm), for example, at 3, 6, 100, 200, 300, and 600 rpm.

A substance can develop gel strength. As used herein, the "10 second(s) gel strength" of a treatment fluid is measured according to ANSI/API 13B-1 section 6.3, Recommended Practice for Field Testing of Water-based Drilling Fluids as follows. After the rheology testing of the substance is performed, the substance is allowed to sit in the test cell for 10 s. The motor of the viscometer is then started at 3 rpm. The maximum deflection on the dial reading is then multiplied by 0.48 to obtain the gel strength at 10 s in units of pounds per 100 square feet (lb/100 ft$^2$). As used herein, the "10 minute (min) gel strength" is measured as follows. After the initial gel strength test has been performed, the substance is allowed to sit in the test cell for 10 min. The motor of the viscometer is then started at 3 rpm. The maximum deflection on the dial reading is multiplied by 0.48 to obtain the gel strength at 10 min in units of lb/100 ft$^2$.

As used herein, the "plastic viscosity" of a treatment fluid is obtained from the Bingham-Plastic rheological model and calculated as the difference between the 600 rpm and 300 rpm dial readings from the rheology testing, expressed in units of centipoise (cP).

The yield point (YP) is defined as the value obtained from the Bingham-Plastic rheological model when extrapolated to a shear rate of zero. As used herein, the "yield point" of a treatment fluid is calculated as the difference between the plastic viscosity and the 300 rpm dial reading, expressed in units of lb/100 ft$^2$. Similarly, the yield stress, or Tau zero, is the stress that must be applied to a material to make it begin to flow (or yield) and may commonly be calculated from rheometer readings measured at rates of 3, 6, 100, 200, 300, and 600 rpm. The extrapolation in this case may be performed by applying a least-squares or curve fit to the Herchel-Bulkley rheological model.

Another desirable property of a treatment fluid is low fluid loss. As used herein, the "fluid loss" of a treatment fluid is tested according to the ANSI/API 13B-1, Fourth edition, section 7.2, Recommended Practice for Field Testing of Water-based Drilling Fluids procedure at a specified temperature and pressure differential as follows. The treatment fluid is mixed. The treatment fluid is stirred for 5 min using a multi-mixer. The treatment fluid is poured into the filter cell. The testing apparatus is assembled with a filter paper inserted into the apparatus. The specified pressure differential is set. A timer is started and filtrate out of the testing apparatus is collected in a separate volumetric container. The testing is performed for 30 min. The total volume of filtrate collected is read. Fluid loss is measured in milliliters (mL) of fluid collected in 30 min.

Another desirable property of a treatment fluid is a high shale retention value. A shale erosion test is commonly employed to determine the ability of a treatment fluid and/or the additives therein to prevent a shale formation from eroding. Such erosion, when encountered in actual field conditions in a borehole, and as noted above, can lead to problems ranging from sloughing, to a washout, to a complete collapse of the borehole. As used herein, the "shale retention" test is performed as follows. The treatment fluid is mixed. The treatment fluid is hot rolled at 200° F. (93° C.) for 16 hours. A portion of a specified shale formation is crushed and ground into particles that passed through a dry sieve US #5 mesh screen, but are retained on a dry sieve US #10 mesh screen. 30 grams (g) of the ground shale and 1 barrel of the treatment fluid are placed into a pint jar. The shale/treatment fluid mixture is then hot rolled on a rolling apparatus at a temperature of 200° F. (93° C.) for 16 hours. The treatment fluid is then screened through the dry sieve US #10 mesh screen, and the retained solids are washed with a synthetic seawater or a 5% sodium chloride (NaCl) solution, dried, and weighed. The percent of shale retention is calculated according to the following formula, where FW=the final weight in grams of the dried shale recovered (corrected for the moisture content of the original sample) and IW=the initial weight of the sample. A shale retention value of greater than or equal to 90% indicates a high shale retention value.

$$\text{Shale Retention} = \frac{FW}{IW} * 100\%$$

According to certain embodiments, an aqueous-based treatment fluid comprises: a base fluid, wherein the base fluid comprises water; and an additive, wherein the additive comprises a biopolymer matrix and a polymer comprising a functional group containing nitrogen.

According to another embodiment, a method of using the aqueous-based treatment fluid comprises introducing the treatment fluid into a wellbore, wherein the wellbore penetrates a subterranean formation.

The discussion of preferred embodiments regarding the treatment fluid or any ingredient in the treatment fluid is intended to apply to the composition embodiments and the method embodiments. Any reference to the unit "gallons" means U.S. gallons.

The base fluid comprises water. The water can be selected from the group consisting of freshwater, brackish water, saltwater, seawater, and any combination thereof. The treatment fluid can further include a water-soluble salt. The salt can be selected from the group consisting of sodium chloride, calcium chloride, calcium bromide, potassium chloride, potassium bromide, magnesium chloride, sodium bromide, cesium formate, cesium acetate, and any combination thereof. The water-soluble salt can be in a concentration in the range of about 5 to about 25 pounds per barrel (ppb) of the treatment fluid.

The treatment fluid includes an additive. The additive comprises a biopolymer matrix. Biopolymers are polymers made by living organisms. Biopolymers generally include polynucleotides, polypeptides, and polysaccharides. Xanthan is an example of a polysaccharide biopolymer. A polysaccharide biopolymer can be made by the fermentation of a sugar (i.e., a carbohydrate, for example a monosaccharide, disaccharide, or polysaccharide) via one or more microorganisms, also known as microbes. Xanthan, for example, can be formed by the fermentation of glucose, sucrose, or lactose by the *Xanthomonas campestris* bacterium. Extracellular polysaccharide substances (EPS) or exopolysaccharides are high-molecular-weight polymers that are composed of sugar residues and are extracellular polymers secreted outside the cell walls of a microorganism. As used herein, a "high-molecular-weight polymer" is a polymer having a molecular weight of greater than 50,000.

The biopolymer can be a polysaccharide or an exopolysaccharide. The biopolymer and its corresponding microorganism can be selected from the group consisting of alginate (*Azotobacter vinelandii*), cellulose (*Acetobacter xylinum*), chitosan (*Mucorales* spp.), curdlan (*Alcaligenes faecalis* var. *myxogenes*), cyclosophorans (*Agrobacterium* spp., *Rhizobium* spp., and *Xanthomonas* spp.), dextran (*Leuconostoc mesenteroides, Leuconostoc dextranigum,* and *Lactobacillus hilgardii*), emulsan (*Acinetobacter calcoaceticus*), galactoglucopolysaccharides (*Achromobacter* spp., *Agrobacterium radiobacter, Pseudomonas marginalis, Rhizobium* spp., and *Zooglea'* spp.), gellan (*Aureomonas elodea* and *Sphingomonas paucimobilis*), glucuronan (*Sinorhizobium meliloti*), N-acetyl-glucosamine (*Staphylococcus epidermidis*), N-acetyl-heparosan (*Escherichia coli*), hyaluronic acid (*Streptococcus equi*), indican (*Beijerinckia indica*), kefiran (*Lactobacillus hilgardii*), lentinan (*Lentinus edodes*), levan (*Alcaligenes viscosus, Zymomonas mobilis,* and *Bacillus subtilis*), pullulan (*Aureobasidium pullulans*), scleroglucan (*Sclerotium rolfsii, Sclerotium delfinii,* and *Sclerotium glucanigum*), schizophyllan (*Schizophylum commune*), stewartan (*Pantoea stewartii* subsp. *stewartii*), succinoglycan (*Alcaligenes faecalis* var. *myxogenes* and *Sinorhizobium meliloti*), xanthan (*Xanthomonas campestris*), and welan (*Alcaligenes* spp.).

The additive also includes a polymer comprising a functional group containing nitrogen. By way of example, the polymer can include an amine functional group, imide functional group, and/or imine functional group. The polymer can also comprise two or more functional groups containing nitrogen. The polymer can be an organic or inorganic compound. The polymer can be selected from the group consisting of polyamines, polyimines, polyamides, and combinations thereof.

The treatment fluid can further comprise a second polymer comprising a functional group containing nitrogen. By way of example, the treatment fluid can include a first organic polymer and a second organic polymer; a first organic polymer and a second inorganic polymer; or a first inorganic polymer and a second inorganic polymer, wherein the first and second polymers (whether organic or inorganic) are different. The treatment fluid can include, for example, a first organic polymer of polyethyleneimine and a second organic polymer of polyacrylamide.

According to certain embodiments, the additive is soluble in the base fluid. As used herein, the term "soluble" means at least 5 parts of the substance dissolves in 100 parts of the solvent.

The polymer(s) can become entangled within the biopolymer matrix. The biopolymer can be in at least a sufficient concentration such that a matrix is formed and the polymer becomes entangled within the matrix. According to certain embodiments, the biopolymer is in a concentration of at least 60% by weight of the additive. The biopolymer can also be in a concentration in the range of 60% to 85% by weight of the additive.

According to certain embodiments, the polymer has a molecular weight in the range of about 50,000 to about 8,000,000. The polymer can also have a molecular weight less than or equal to a molecular weight such that the polymer can become entangled within the biopolymer matrix.

The polymer and any additional polymers can be in a concentration of 15% by weight of the additive. The polymer and any additional polymers can also be in a concentration in the range of 15% to 40% by weight of the additive. If the additive comprises two polymers, then the ratio of the polymers can be in the range of 1:4 to 4:1.

The additive can be in a concentration of at least 1 ppb of the treatment fluid. The additive can also be in a concentration in the range of about 1 to about 10 or in the range of about 1.5 to about 5 ppb of the treatment fluid. The additive can also be in a concentration in the range of about 0.5% to about 8% or in the range of about 1% to about 5% by weight of the treatment fluid.

The additive can be a fluid loss additive. The treatment fluid can have a fluid loss less than 20 or less than 10 milliliters/30 minutes (mL/30 min) at a temperature of 73° F. (23° C.) and a pressure differential of 100 psi (0.7 MPa). According to certain embodiments, the polymer, any additional polymers, the concentration of the additive, and the number of functional groups containing nitrogen are selected such that the treatment fluid has a fluid loss of less than 20 or less than 10 mL/30 min at a temperature of 73° C. (23° C.) and a pressure differential of 100 psi (0.7 MPa).

The additive can be a rheology modifier. According to certain embodiments, the polymer, any additional polymers, the concentration of the additive, and the number of functional groups containing nitrogen are selected such that the treatment fluid has a desired rheology.

The additive can be a shale stabilizer. The treatment fluid can have a shale retention of at least 90% or at least 95% for the subterranean formation. According to certain embodiments, the polymer, any additional polymers, the concentration of the additive, and the number of functional groups containing nitrogen are selected such that the treatment fluid has a shale retention value of at least 90% or at least 95% for the subterranean formation. The number of functional groups containing nitrogen can be selected based on the reactivity of the subterranean formation. For example, the greater the reactivity of the subterranean formation, the more functional groups containing nitrogen may need to be included in the additive and vice versa. Without being limited by theory, it is believed that it is the presence of available nitrogen atoms in the additive that chemically react with the water-reactive components of the subterranean formation to prevent adverse effects to the subterranean formation. Therefore, for a subterranean formation having highly reactive components, a greater number of available nitrogen atoms may be needed to provide the desired shale retention values.

The additive can be a biocide. According to certain embodiments, the polymer, any additional polymers, the concentration of the additive, and the number of functional groups containing nitrogen are selected such that the additive functions as a biocide.

It has been shown that the addition of the polymer (and any additional polymers) creates a synergistic effect with the biopolymer matrix. The synergistic effect allows the additive to provide the desired properties (e.g., fluid loss, shale retention, etc.) to the treatment fluid. The synergistic effect means that better properties are imparted to the treatment fluid compared to a treatment fluid containing an additive of the biopolymer alone or the polymer(s) alone.

The treatment fluid can further include a viscosifier. The viscosifier can be selected from the group consisting of: fatty acids; natural and synthetic polymers; polysaccharide derivatives, such as xanthan gum, guar gum, hydroxyalkylguar, hydroxyalkylcellulose, carboxyalkylhydroxyalkylguar, wellan gum, gellan gum, diutan, scleroglucan, and succinoglucan; various celluloses; biopolymers; and combinations thereof. Commercially-available examples of a suitable viscosifier include, but are not limited to, BARAZAN® D PLUS, PAC™-R, PAC™-RE, PAC™-L, AQUA-GEL®, AQUAGEL GOLD SEAL®, and combinations thereof, marketed by Halliburton Energy Services, Inc. According to an embodiment, the viscosifier is in a concentration of at least 0.5 ppb of the treatment fluid. The viscosifier can also be in a concentration in the range of about 1 to about 15 ppb, alternatively of about 5 to about 10 ppb, of the treatment fluid.

The treatment fluid can further include a weighting agent. The weighting agent can be selected from the group consisting of barite, hematite, manganese tetroxide, calcium carbonate, and combinations thereof. Commercially available examples of a suitable weighting agent include, but are not limited to, Barite, BAROID®, BARODENSE®, MICROMAX™, and combinations thereof, marketed by Halliburton Energy Services, Inc. According to certain embodiments, the weighting agent is in a concentration of at least 20 ppb of the treatment fluid. The weighting agent can also be in a concentration in the range of about 20 to about 500 ppb of the treatment fluid. According to other embodiments, the weighting agent is in at least a sufficient concentration such that the treatment fluid has a density in the range of about 9 to about 20 ppg (about 1.078 to about 2.397 kilograms per liter (kg/L)).

The treatment fluid can further include a filtration agent, such as a lost circulation material, filtration control agent, or bridging agent. The filtration agent can be selected from the group consisting of: starches, such as potato starch, corn starch, tapioca starch, wheat starch and rice starch; cellulose; lignosulfonates; polysaccharides; sized calcium carbonate; and combinations thereof. Commercially available examples of a suitable filtration agent include, but are not limited to, PAC™-R, DEXTRID® E, and combinations thereof, marketed by Halliburton Energy Services, Inc. According to certain embodiments, the filtration agent is in at least a sufficient concentration such that the treatment fluid has a fluid loss of less than 10 mL/30 min at a temperature of 73° F. (23° C.) and a pressure differential of 100 psi (0.7 MPa). According to other embodiments, the filtration agent is in a concentration of at least 0.5 ppb of the treatment fluid. The filtration agent can also be in a concentration in the range of about 0.5 to about 15 ppb of the treatment fluid.

The treatment fluid can also include a friction reducer. Commercially available examples of a suitable friction reducer include, but are not limited to, TORQ-TRIM® 22, LUBRA-BEADS®, EZMUD LUBE®, NXS-LUBE™, DRIL-N-SLIDE™, ENVIRO-TORQ®, graphitic carbon, and combinations thereof, marketed by Halliburton Energy Services, Inc. The friction reducer can be in a concentration of at least 0.5 ppb of the treatment fluid. The friction reducer can also be in a concentration in the range of about 0.5 to about 5 ppb of the treatment fluid.

The treatment fluid can have a pH in the range of about 7.5 to about 10.5. The treatment fluid can further comprise a pH adjuster. The pH adjuster can be an acid or a base. According to certain embodiments, the pH adjuster is selected and the pH adjuster is in a concentration such that the treatment fluid has a pH in the range of about 7.5 to about 10.5. The treatment fluid can also include a base for modifying pH. A commercially available example of a commonly used base is NaOH. The pH buffer can be in a concentration in the range of about 0.05 to about 5 ppb of the treatment fluid.

The treatment fluid can include an oxygen scavenger. The oxygen scavenger can be selected from the group consisting of sodium thiosulfate, an alkali metal thiosulfate, sodium dithionite, disodium phosphate, sodium sulfite, zinc sulfite, hydroquinone, hydrazine, diethylhydroxylamine, carbohydrazide, and combinations thereof. The oxygen scavenger can be in a concentration in the range of about 0.05 to about 5 ppb of the treatment fluid.

According to the method embodiments, the methods include introducing the treatment fluid into a wellbore, wherein the wellbore penetrates a subterranean formation. The subterranean formation can be on land or offshore. The subterranean formation is preferably a water-sensitive formation. According to other embodiments, the subterranean formation is a shale formation.

The treatment fluid can be a drilling fluid, completion fluid, workover fluid, injection fluid, or stimulation fluid. The treatment fluid can be in a pumpable state before and during introduction into the wellbore. The well can be an oil, gas, and/or water production well, an injection well, or a geothermal well. The subterranean formation can include an annulus. The step of introducing the treatment fluid can include introducing the treatment fluid into a portion of the annulus.

For a treatment fluid that is a drilling fluid, the methods can further include the step of introducing a spacer fluid into the wellbore after the step of introducing the drilling fluid. The methods can also further include the step of introducing a cement composition into the wellbore. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be performed after the step of introducing the drilling fluid. If the methods also include the step of introducing a spacer fluid, then the step of introducing the cement composition can be performed after the step of introducing the spacer fluid. The step of introducing the cement composition can be for the purpose of at least one of the following: well completion; foam cementing; primary or secondary cementing operations; well plugging; and gravel packing. The cement composition can be in a pumpable state before and during introduction into the subterranean formation. The step of introducing can include introducing the cement composition into the well. According to another embodiment, the subterranean formation is penetrated by a well and the well includes an annulus. According to this other embodiment, the step of introducing can include introducing the cement composition into a portion of the annulus.

The method embodiments can also include allowing the cement composition to set. The step of allowing can be performed after the step of introducing the cement composition into the subterranean formation. The methods can further include the additional steps of perforating, fracturing, or performing an acidizing treatment after the step of allowing.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, as well as other wellbore operations (e.g., completion, injection, workover, and stimulation) without departing from the scope of the disclosure.

The following discussion pertains to the use of the treatment fluid as a drilling fluid, but it should be understood that parts of the discussion can be equally applicable to other types of treatment fluids, such as completion fluids, stimulation fluids, etc. As illustrated, the wellbore assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments, however, the disclosed fluids can be added to the drilling fluid 122 at any other location in the drilling assembly 100. In at least one embodiment, for example, there could be more than one retention pit 132, such as multiple retention pits 132 in series (not shown). Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128, which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any measuring while drilling/logging while drilling (MWD/LWD) tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, polycrystalline diamond compact (PDC) bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables and FIG. 2, the concentration of any ingredient in a treatment fluid is expressed as pounds per barrel (ppb) of the treatment fluid.

Each of the treatment fluids were mixed and tested according to the procedure for the specific test as described in The Detailed Description section above. Rheology testing, 10 second(s) and 10 minute (min) gel strength, plastic viscosity, and yield point were conducted at a temperature of 120° F. (49° C.). Shale retention testing was performed on samples from the London clay formation after hot rolling at a temperature of 200° F. (93° C.) for 16 hours.

Table 1 contains a list of the ingredients and their respective concentrations for 10 different treatment fluids. Each of the treatment fluids had a density of 11 pounds per gallon (ppg) and contained the following ingredients, listed at a concentration of ppb of the treatment fluid: freshwater; BARAZAN® D PLUS viscosifier; PAC™-R filtration control agent; BARACARB® bridging agent; BARABUF® filtration control agent; NaOH pH buffer; barite weighting agent; BARASCAV™ D oxygen scavenger; and polymer composites #1-#10 as the additive.

TABLE 1

| Ingredient | Concentration (ppb) |
| --- | --- |
| Freshwater | 304 |
| Viscosifier | 6.2 |
| Filtration Control Agent | 5.2 |
| pH buffer | 0.2 |
| Bridging Agent | 10 |
| Weighting Agent | 133 |
| Oxygen Scavenger | 0.5 |
| Polymer Composites #1-#10 | 2.5 |

Table 2 contains the biopolymer and polymers and their respective concentrations and ratios for the polymer composites #1-#10. Chitosan was used as the biopolymer matrix, polyethyleneimine (PEI) was used as a first polymer, and partially-hydrolyzed polyacrylamide (PHPA) was used as a second polymer. Polymer composites #1-#3 were included as controls.

TABLE 2

| Polymer Composite # | Chitosan Conc. (% by weight) | PEI Conc. (% by weight) | PHPA Conc. (% by weight) | Chitosan:PEI:PHPA Ratio |
| --- | --- | --- | --- | --- |
| 1 | — | — | 100 | 0:0:1 |
| 2 | — | 100 | — | 0:1:0 |
| 3 | 100 | — | — | 1:0:0 |
| 4 | 76 | 24 | 0 | 3:1:0 |
| 5 | 76 | 4 | 20 | 19:1:4 |
| 6 | 76 | 20 | 4 | 19:4:1 |
| 7 | 76 | 12 | 12 | 6:1:1 |
| 8 | 0 | 50 | 50 | 0:1:1 |
| 9 | 50 | 0 | 50 | 1:0:1 |
| 10 | 50 | 50 | 0 | 1:1:0 |

Table 3 contains the polymer composite number, rheology, plastic viscosity (PV) in units of centipoise (cP), yield point (YP) in units of lb/100 sq. ft., and 10 s and 10 min gel strength in units of lb/100 sq. ft. data for the treatment fluids containing polymer composites #1 and #4-#7. As can be seen in Table 3, the treatment fluids including the polymer composites exhibited desirable and comparable rheologies to the control composite #1. Moreover, all of the treatment fluids exhibited desirable and comparable PV, YP, and gel strengths compared to the control.

TABLE 3

| Polymer Composite # | Rheology (rpm) | | | | PV (cP) | YP (lb/100 sq. ft.) | 10 sec. gel strength (lb/100 sq. ft.) | 10 min. gel strength (lb/100 sq. ft.) |
|---|---|---|---|---|---|---|---|---|
| | 3 | 6 | 300 | 600 | | | | |
| 1 | 5 | 7 | 44 | 60 | 16 | 28 | 5 | 8 |
| 4 | 8 | 11 | 49 | 64 | 15 | 34 | 8 | 11 |
| 5 | 11 | 13 | 50 | 66 | 16 | 34 | 11 | 13 |
| 6 | 10 | 12 | 51 | 67 | 16 | 35 | 12 | 13 |
| 7 | 12 | 15 | 55 | 72 | 17 | 38 | 13 | 15 |

Figure 2:
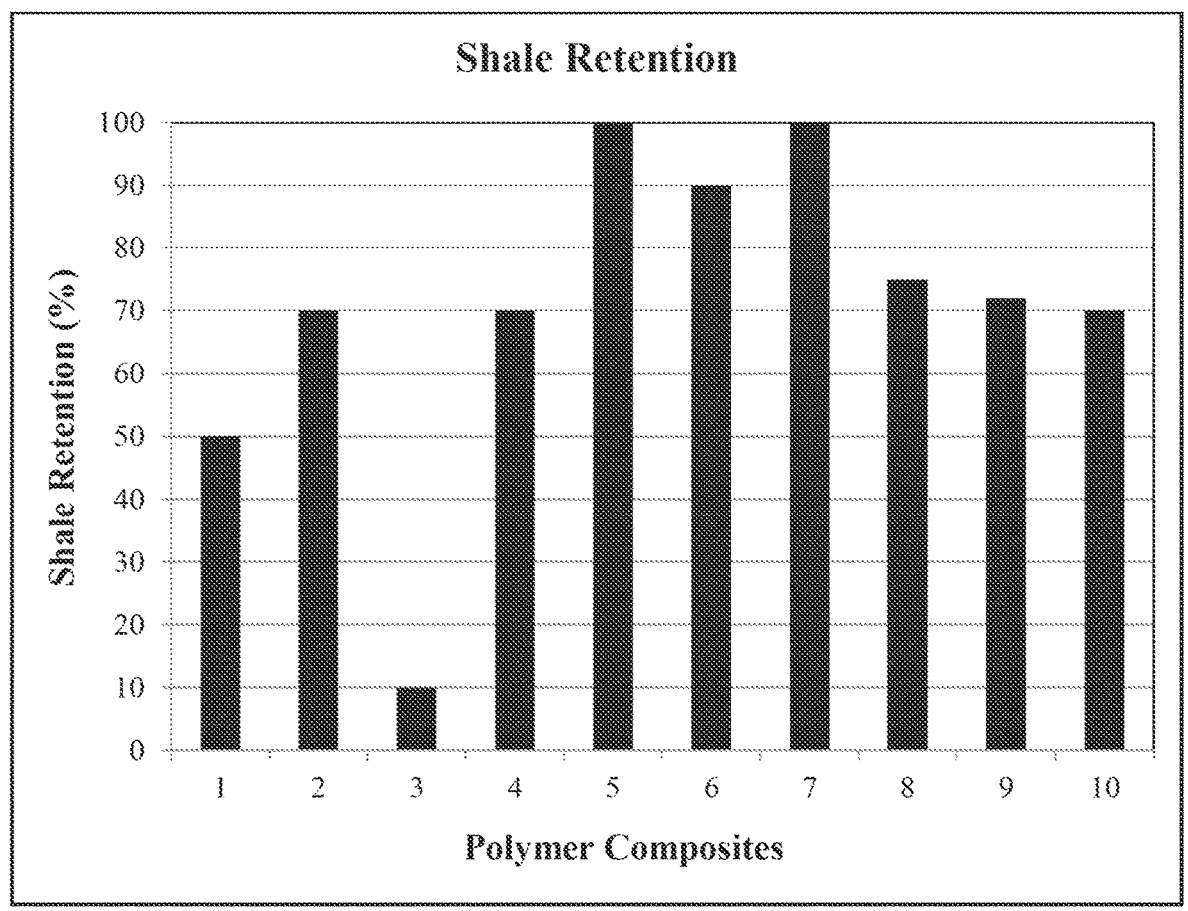
FIG. 2 is a bar graph showing the percentage of shale retention for treatment fluids containing ten different polymer composites according to different embodiments.

FIG. 2 is a bar graph of treatment fluids containing polymer composites #1-#10 showing the shale retention. As can be seen in FIG. 2, each of the control fluids #1-#3 had a shale retention of 70% or less. This indicates poor shale stability. Only fluids containing the biopolymer matrix and both polymers (PEI and PHPA), namely, fluids containing polymer composites #5-#7, exhibited excellent shale retention values of 90% or greater. This indicates that a synergistic effect is present when combining the biopolymer matrix with both polymers.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method of using an aqueous-based treatment fluid comprising:
   introducing the treatment fluid into a wellbore, wherein the wellbore penetrates a subterranean formation, wherein the treatment fluid comprises:
   (A) a base fluid, wherein the base fluid comprises water; and
   (B) an additive, wherein the additive comprises a biopolymer forming a biopolymer matrix, polyethyleneimine, and polyacrylamide, wherein the polyethyleneimine, and polyacrylarmide are entangled within the biopolymer matrix; wherein the polyethyleneimine, and polyacrylamide are present in a ratio of about 1:4 to about 4:1; wherein the biopolymer is chitosan and is in a concentration in the range of 60% to 85% by weight of the additive; wherein the additive is in a concentration in the range of about 1 to about 10 pounds per gallon of the treatment fluid.

2. The method according to claim 1, wherein the water is selected from the group consisting of freshwater, brackish water, saltwater, and any combination thereof.

3. The method according to claim 1, wherein the treatment fluid further comprises a water-soluble salt.

4. The method according to claim 3, wherein the salt is selected from the group consisting of sodium chloride, calcium chloride, calcium bromide, potassium chloride, potassium bromide, magnesium chloride, sodium bromide, cesium formate, cesium acetate, and any combination thereof.

5. The method according to claim 1, wherein the polyethyleneimine, and polyacrylamide are in a concentration in the range of 15% to 40% by weight of the additive.

6. The method according to claim 1, wherein the additive is a shale stabilizer.

7. The method according to claim 1, wherein the treatment fluid provides a shale retention value of at least 90% for the subterranean formation.

8. The method according to claim 1, wherein the subterranean formation is a water-sensitive formation.

9. The method according to claim 1, wherein the subterranean formation is a shale formation.

10. The method according to claim 1, wherein the step of introducing comprises using a pump to pump the treatment fluid into the wellbore.

\* \* \* \* \*